(12) United States Patent
Kreitman et al.

(10) Patent No.: US 7,517,569 B2
(45) Date of Patent: Apr. 14, 2009

(54) SHRINK PACKAGING BARRIER FILM

(75) Inventors: Stephanie G. Kreitman, Simpsonville, SC (US); Mendy J. Mossbrook, Woodruff, SC (US); Michael Broadus, Mauldin, SC (US)

(73) Assignee: Cryovac, Inc., Duncan, SC (US)

( * ) Notice: Subject to any disclaimer, the term of this patent is extended or adjusted under 35 U.S.C. 154(b) by 522 days.

(21) Appl. No.: 11/145,607

(22) Filed: Jun. 6, 2005

(65) Prior Publication Data

US 2006/0272767 A1    Dec. 7, 2006

(51) Int. Cl.
- B65B 53/02 (2006.01)
- B32B 1/08 (2006.01)
- B32B 27/08 (2006.01)
- B32B 27/30 (2006.01)
- B32B 27/32 (2006.01)

(52) U.S. Cl. .................... 428/34.9; 428/35.4; 428/36.6; 428/36.7; 428/518; 428/520

(58) Field of Classification Search ........................ None
See application file for complete search history.

(56) References Cited

U.S. PATENT DOCUMENTS

| | | | |
|---|---|---|---|
| 4,207,363 A | 6/1980 | Lustig et al. | |
| 4,469,742 A | 9/1984 | Oberle et al. | |
| 4,511,610 A | 4/1985 | Yazaki et al. | |
| 4,532,189 A | 7/1985 | Mueller | |
| 4,599,276 A | 7/1986 | Martini | |
| 4,640,856 A | 2/1987 | Ferguson et al. | |
| 4,735,855 A | 4/1988 | Wofford et al. | |
| 4,746,562 A | 5/1988 | Fant | |
| 4,755,419 A | 7/1988 | Shah | |
| 4,801,486 A | 1/1989 | Quacquarella et al. | |
| 4,965,136 A | 10/1990 | Mueller | |
| 5,035,955 A | 7/1991 | Matsukura et al. | |
| 5,051,481 A | 9/1991 | Taka et al. | |
| 5,055,355 A | 10/1991 | DeAntonis et al. | |
| 5,097,955 A | 3/1992 | Kluter et al. | |
| 5,306,745 A | 4/1994 | Herran et al. | |
| 5,318,829 A * | 6/1994 | Tada et al. .................... 428/213 |
| 5,350,622 A | 9/1994 | Speer et al. | |
| 5,358,792 A | 10/1994 | Mehta et al. | |
| 5,482,770 A | 1/1996 | Bekele | |
| 5,529,833 A | 6/1996 | Speer et al. | |
| 5,677,044 A | 10/1997 | Beccarini et al. | |
| 5,707,751 A | 1/1998 | Garza et al. | |
| 5,837,335 A | 11/1998 | Babrowicz | |
| 5,916,613 A | 6/1999 | Stockley, III | |
| 5,919,547 A | 7/1999 | Kocher et al. | |
| 6,033,758 A | 3/2000 | Kocher et al. | |
| 6,068,933 A | 5/2000 | Shepard et al. | |
| 6,094,889 A | 8/2000 | Van Loon et al. | |
| 6,203,750 B1 | 3/2001 | Ahlgren et al. | |
| 6,221,410 B1 | 4/2001 | Ramesh et al. | |
| 6,274,228 B1 | 8/2001 | Ramesh et al. | |
| 6,287,613 B1 | 9/2001 | Childress et al. | |
| 6,291,041 B1 | 9/2001 | Howells et al. | |
| 6,296,886 B1 | 10/2001 | DePoorter et al. | |
| 6,503,637 B1 | 1/2003 | Van Loon | |
| 6,534,580 B1 | 3/2003 | Hanada et al. | |
| 6,562,476 B2 | 5/2003 | Shepard et al. | |
| 6,599,639 B2 | 7/2003 | Dayrit et al. | |
| 6,624,247 B2 | 9/2003 | Kume et al. | |
| 6,645,641 B2 | 11/2003 | Eckstein et al. | |
| 6,727,000 B2 | 4/2004 | July et al. | |
| 6,764,729 B2 | 7/2004 | Ramesh et al. | |
| 6,787,220 B2 | 9/2004 | Wallace et al. | |
| 6,790,468 B1 | 9/2004 | Mize, Jr. et al. | |
| 6,861,125 B1 | 3/2005 | Carlson et al. | |
| 6,861,127 B2 | 3/2005 | Glawe et al. | |
| 2001/0008660 A1 | 7/2001 | Stall et al. .................... 428/35.4 |
| 2001/0046606 A1 | 11/2001 | Tau et al. | |
| 2004/0048080 A1 | 3/2004 | Schell et al. | |
| 2004/0170851 A1 | 9/2004 | Lischefski | |

FOREIGN PATENT DOCUMENTS

| | | |
|---|---|---|
| EP | 0 145 014 | 6/1985 |
| EP | 0 203 727 | 3/1986 |
| EP | 0 269 350 | 6/1988 |
| EP | 0 600 246 | 8/1994 |
| EP | 0 663 422 B1 | 7/1995 |
| EP | 1 095 765 A2 | 5/2001 |
| EP | 1 270 651 A1 | 1/2003 |
| EP | 1 332 868 B1 | 4/2005 |
| WO | 00/02961 | 1/2000 |
| WO | 01/70500 A1 | 9/2001 |
| WO | 03/040202 A2 | 5/2003 |

OTHER PUBLICATIONS

B255 film as described on p. 22 of the Application "Compare 1".
NS60 film as described on the cover sheet for this PTO-1449 form.
T-series forming web film as described on the cover sheet for this PTO-1449 form.
Sealed Air / Cryovac, Food Packaging Systems Brochure, "New Path" (Jan. 2003), which mentions the T-series forming web on p. 5.

\* cited by examiner

*Primary Examiner*—D. S Nakarani
(74) *Attorney, Agent, or Firm*—Daniel B. Ruble

(57) ABSTRACT

A film comprises a barrier layer including PVdC or EVOH, a skin layer, and an intermediate layer comprising at least about 50% of propylene/ethylene copolymer. The film has at least about 10% free shrink in at least one direction at 85° C. The film is useful in making barrier shrink bags.

38 Claims, No Drawings

SHRINK PACKAGING BARRIER FILM

BACKGROUND OF THE INVENTION

The present invention relates to shrink films, and more particularly to barrier shrink films useful in forming bags.

Barrier shrink packaging films are used, for example, in automated machine packaging of meat products. A film is said to have good "machinability" if it can be used with a packaging machine without undue creasing, folding, seal pleats, edge curls, or jamming. An attribute of a film that may contribute to good machinability is a higher level of stiffness of the film. However, an increase in the modulus (i.e., stiffness) of a film may result in undesirably reduced free shrink and appearance characteristics (e.g., gloss, haze, and total transmission) of the film.

SUMMARY OF THE INVENTION

One or more embodiments of the present invention may address one or more of the aforementioned problems.

A film comprises a barrier layer, a skin layer, and an intermediate layer between the barrier layer and the skin layer. The barrier layer comprises a polymer selected from vinylidene chloride polymer and ethylene/vinyl alcohol copolymer. The skin layer forms an outer surface of the film. The intermediate layer comprises at least about 50%, by weight of the intermediate layer, of propylene/ethylene copolymer. The film has at least about 10% free shrink in at least one direction measured at 85° C. according to ASTM D2732.

These and other objects, advantages, and features of the invention will be more readily understood and appreciated by reference to the detailed description of the invention and the drawings.

DETAILED DESCRIPTION OF THE INVENTION

A film useful for shrink bag packaging may include the following layers: a barrier layer, an outer skin layer (e.g., a sealant layer or abuse layer), an intermediate layer between the barrier layer and the skin layer, a tie layer, and a core layer. These layers are discussed below.

The film may comprise at least any of the following numbers of layers: 3, 4, 5, 7, 9; and may comprise at most any of the following numbers of layers: 4, 5, 6, 7, 8, 9, 11, 13, and 15. The term "layer" refers to a discrete film component which is substantially coextensive with the film and has a substantially uniform composition. Where two or more directly adjacent layers have essentially the same composition, then these two or more adjacent layers may be considered a single layer for the purposes of this application.

The film may have a total thickness of at least about, and/or at most about, any of the following: 1, 2, 3, 4, 5, 7, 9, 10, 12, and 15 mils.

Barrier Layer

The barrier layer comprises one or more barrier polymers that markedly decrease the oxygen transmission rate through the barrier layer and thus the film incorporating the barrier layer. The barrier layer may be an internal layer of the film. An "internal layer" is a layer of the film that is between two other layers of the film. Useful barrier polymers include vinylidene chloride polymers ("PVdC") and ethylene/vinyl alcohol copolymers ("EVOH").

Vinylidene chloride polymer ("PVdC") is a vinylidene chloride-containing polymer or copolymer—that is, a polymer that includes at least 50 weight percent monomer units derived from vinylidene chloride ($CH_2=CCl_2$). PVdC optionally includes monomer units derived from one or more of vinyl chloride, styrene, vinyl acetate, acrylonitrile, and $C_1$-$C_{12}$ alkyl esters of (meth)acrylic acid (e.g., methyl acrylate, butyl acrylate, methyl methacrylate). As used herein, "(meth)acrylic acid" refers to both acrylic acid and/or methacrylic acid; and "(meth)acrylate" refers to both acrylate and methacrylate. Examples of PVdC include one or more of the following: vinylidene chloride homopolymer, vinylidene chloride/vinyl chloride copolymer ("VDC/VC"), vinylidene chloride/methyl acrylate copolymer ("VDC/MA"), vinylidene chloride/ethyl acrylate copolymer, vinylidene chloride/ethyl methacrylate copolymer, vinylidene chloride/methyl methacrylate copolymer, vinylidene chloride/butyl acrylate copolymer, vinylidene chloride/styrene copolymer, vinylidene chloride/acrylonitrile copolymer, and vinylidene chloride/vinyl acetate copolymer.

Useful PVdC includes that having at least about 75, at most about 95, and at most about 98 weight % vinylidene chloride monomer. Useful PVdC (for example, as applied by latex emulsion coating) includes that having at least about any of 5%, 10%, and 15%—and/or at most about any of 25%, 22%, 20%, and 15 weight %—comonomer with the vinylidene chloride monomer.

Useful PVdC includes that having a weight-average molecular weight ($M_w$) of at least about any of the following 10,000; 50,000; 80,000; 90,000; 100,000; 111,000; 120,000; 150,000; and 180,000; and at most about any of the following: 180,000, 170,000; 160,000; 150,000; 140,000; 100,000; and 50,000. Useful PVdC also includes that having a viscosity-average molecular weight ($M_z$) of at least about any of the following: 130,000; 150,000; 170,000; 200,000; 250,000; and 300,000; and at most about any of the following: 300,000; 270,000; 250,000; and 240,000.

A barrier layer that comprises PVdC may also include a thermal stabilizer (e.g., a hydrogen chloride scavenger such as epoxidized soybean oil) and a lubricating processing aid (e.g., one or more polyacrylates).

Ethylene/vinyl alcohol copolymer ("EVOH") is another useful barrier polymer. EVOH may have an ethylene content of about 32%, or at least about any of the following values: 20%, 25%, 30%, and 38% by weight. EVOH may have an ethylene content of at most about any of the following values: 50%, 48%, 40%, 35%, and 33% by weight. EVOH may include saponified or hydrolyzed ethylene/vinyl acetate copolymers, such as those having a degree of hydrolysis of at least about any of the following values: 50% and 85%. EVOH may have an ethylene content ranging from about 20 mole percent to about 44 mole percent. Exemplary EVOH is commercially available from Evalca Corporation having ethylene contents of 29, 32, 35, 38 and 44 mole percent.

The barrier layer may comprise one or more barrier polymers (e.g., one or more of any of PVdC and/or EVOH) in an amount of at least about any of the following: 50%, 60%, 70%, 80%, 90%, 95%, and 100%; and/or at most about any of the following: 60%, 70%, 80%, 90%, and 95%, based on the weight of the barrier layer.

The film may have an oxygen transmission rate of at most about any of the following values: 1,000, 500, 400, 300, 200, 150, 100, 50, 45, 40, 35, 30, 25, 20, 15, 10, and 5 cubic centimeters (at standard temperature and pressure) per square meter per day per 1 atmosphere of oxygen pressure differential measured at 0% relative humidity and 23° C. Unless otherwise noted, all references to oxygen transmission rate in this application are measured at these conditions according to ASTM D-3985. The barrier layer may have a thickness and composition sufficient to impart to the film comprising the barrier layer any of the oxygen transmission rates listed above.

Intermediate PEC Layer

The film comprises an intermediate layer comprising propylene/ethylene copolymer ("PEC"). The intermediate layer is an internal layer of the film between the barrier layer and the skin layer of the film. The intermediate layer may be directly adjacent the skin layer, so that there is no intervening layer between the intermediate and skin layers. Alternatively, an internal layer (e.g., a tie layer) may exist between the intermediate layer and the skin layer. The intermediate layer may be spaced apart from the barrier layer so that the intermediate layer is not directly adjacent the barrier layer, and there is an intervening internal layer (e.g., a tie layer) between the intermediate layer and the barrier layer. Alternatively, the intermediate layer may be directly adjacent the barrier layer.

PEC is a propylene/ethylene copolymer having a majority weight % content of propylene comonomer. ("Copolymer" as used in this application means a polymer derived from two or more types of monomers, and includes terpolymers, etc.) Useful PEC may have an ethylene monomer content of at least about, and/or at most about, any of the following: 1, 1.5, 2, 3, 4, 5, 6, 8, 10, 12, 13.5, and 15 weight percent, based on the weight of the copolymer. Useful PEC may have a density of at least about, and/or at most about, any of the following: 0.885, 0.900, 0.902, and 0.905 g/cc. Unless otherwise indicated, all densities herein are measured according to ASTM D1505. Useful PEC may have a melting point of at least about, and/or at most about, any of the following: 100, 105, 110, 115, 120, 125, 130, 135, 140, and 150° C.

Useful PEC may consist essentially of propylene and ethylene comonomers, or may comprise three, or three or more, types of comonomers. Useful PEC includes, for example, propylene/ethylene/butene copolymers, which may comprise butene comonomer content of at most about, and/or at least about, any of the following: 3, 5, 8, 10, 12, and 15%, based on the weight of the copolymer.

The intermediate layer may comprise one or more of any of the PECs described or characterized in this Application in an amount of at least about any of the following: 50%, 60%, 70%, 80%, 90%, 95%, and 100%; and/or at most about any of the following: 60%, 70%, 80%, 90%, and 95%, based on the weight of the intermediate layer. The intermediate layer may consist essentially of, or may consist of, one or more PECs.

The intermediate layer may comprise random PEC. The PEC in a layer of the film may comprise at least about, and/or at most about, 80%, 90%, 95%, and 100% random PEC, based on the total weight of PEC in a layer.

The intermediate layer may comprise one or more PECs selected from heterogeneous PEC and homogeneous PEC. The PEC in a layer of the film may comprise at least about, and/or at most about, 80%, 90%, 95%, and 100% heterogenous PEC, based on the total weight of PEC in a layer. The PEC in a layer of the film may comprise at least about, and/or at most about, 80%, 90%, 95%, and 100% homogeneous PEC, based on the total weight of PEC in a layer. Heterogeneous polymers have a relatively wide variation in molecular weight and composition distribution. Heterogeneous polymers may be prepared with, for example, conventional Ziegler-Natta catalysts. On the other hand, homogeneous polymers have relatively narrow molecular weight and composition distributions, and are typically prepared using single-site catalysts such as metallocene. The distinction between heterogeneous and homogenous polymers are discussed below in more detail.

The film may comprise at least about, and/or at most about, any of the following amounts of PEC based on the weight of the film: 20, 15, 12, 11, 11.5, 10.0, 9.5, 9, 8, and 5%.

The intermediate layer may further comprise one or more polyolefins, such as one or more of any of the polyolefins described below in the skin layer section, in at most about, and/or at least about, any of the following amounts: 45, 40, 35, 30, 25, 20, 15, 10, and 5%, based on the weight of the intermediate layer.

Any of the film, and/or the intermediate layer, and/or any or all film layers between the skin layer and the barrier layer, may comprise less than about any of 40, 30, 20, 10, and 5% polybutylene, based on the weight of the film, of the intermediate layer, or of any or all film layers between the skin layer and the barrier layer, respectively. Any of the film, and/or the intermediate layer, and/or any or all film layers between the skin layer and the barrier layer may be substantially devoid of polybutylene polymer. "Polybutylene polymer" refers to a polymer comprising at least 50 weight % butylene monomer content.

The intermediate layer may have a melting point (i.e., melting temperature) of at least about, and/or at most about, any of the following: 100, 110, 120, 130, 135, 140, 145, and 150° F. All references to the melting point or melting temperature of a polymer, a resin, or a film layer in this application refer to the melting peak temperature of the dominant melting phase of the polymer, resin, or layer as determined by differential scanning calorimetry according to ASTM D-3418. The melting point of the intermediate layer may be less than the melting point of the skin layer by at least about, and/or at most about, any of the following: 5, 10, 15, 20, 25, 30, 35, 40, 45, and 50° C.

Skin Layer

The film comprises a skin layer forming an outer surface of the film. The skin layer is an "outer layer" of the film, that is, a layer that has only one side directly adhered to another layer of the film. For multilayered films, there inherently exists two outer layers of the film. An "outside layer" is an outer layer of the film that is or is intended to be adjacent the space outside of a package comprising the film. An "inside layer" of a film is an outer layer of the film that is or is intended to be adjacent the space inside of a package comprising the film.

The skin layer may be adapted to function as a sealant layer, for example, a layer adapted to facilitate heat sealing the film to itself or another structure. A sealant layer may be an inside layer of a film.

The skin layer may be adapted to function as an abuse layer. An abuse layer may be the outside layer adapted to contact a sealing bar during a heat sealing operation and/or adapted to support a printed image.

The skin layer may comprise one or more thermoplastic polymers, for example, polyolefins, polystyrenes, polyurethanes, polyamides, polyesters, and ionomers, such as any of those described below.

Useful polyolefins include ethylene homo- and co-polymers and propylene homo- and co-polymers. The term "polyolefins" includes copolymers that contain at least 50 weight % monomer units derived from olefin. Ethylene homopolymers include high density polyethylene ("HDPE") and low density polyethylene ("LDPE"). Ethylene copolymers include ethylene/alpha-olefin copolymers ("EAOs"), ethylene/unsaturated ester copolymers, and ethylene/(meth) acrylic acid.

EAOs are copolymers of ethylene and one or more alpha-olefins, the copolymer having ethylene monomer as the majority weight-percentage content. The comonomer may include one or more $C_3$-$C_{20}$ α-olefins, one or more $C_4$-$C_{12}$ α-olefins, and one or more $C_4$-$C_8$ α-olefins. Useful α-olefins include 1-butene, 1-hexene, 1-octene, and mixtures thereof.

EAOs include one or more of the following: 1) medium density polyethylene ("MDPE"), for example having a density of from 0.926 to 0.94 g/cm3; 2) linear medium density polyethylene ("LMDPE"), for example having a density of from 0.926 to 0.94 g/cm3; 3) linear low density polyethylene ("LLDPE"), for example having a density of from 0.915 to 0.930 g/cm3; 4) very-low or ultra-low density polyethylene ("VLDPE" and "ULDPE"), for example having density below 0.915 g/cm3, and 5) homogeneous EAOs. Useful EAOs include those having a density of less than about any of the following: 0.925, 0.922, 0.920, 0.917, 0.915, 0.912, 0.910, 0.907, 0.905, 0.903, 0.900, and 0.898 grams/cubic centimeter. Unless otherwise indicated, all polymer densities herein are measured according to ASTM D1505.

The polyethylene polymers may be either heterogeneous or homogeneous. As is known in the art, heterogeneous polymers have a relatively wide variation in molecular weight and composition distribution. Heterogeneous polymers may be prepared with, for example, conventional Ziegler-Natta catalysts.

On the other hand, homogeneous polymers are typically prepared using metallocene or other single-site catalysts. Such single-site catalysts typically have only one type of catalytic site, which is believed to be the basis for the homogeneity of the polymers resulting from the polymerization. Homogeneous polymers are structurally different from heterogeneous polymers in that homogeneous polymers exhibit a relatively even sequencing of comonomers within a chain, a mirroring of sequence distribution in all chains, and a similarity of length of all chains. As a result, homogeneous polymers have relatively narrow molecular weight and composition distributions. Examples of homogeneous polymers include the metallocene-catalyzed linear homogeneous ethylene/alpha-olefin copolymer resins available from the Exxon Chemical Company (Baytown, Tex.) under the EXACT trademark, linear homogeneous ethylene/alpha-olefin copolymer resins available from the Mitsui Petrochemical Corporation under the TAFMER trademark, and long-chain branched, metallocene-catalyzed homogeneous ethylene/alpha-olefin copolymer resins available from the Dow Chemical Company under the AFFINITY trademark.

Another useful ethylene copolymer is ethylene/unsaturated ester copolymer, which is the copolymer of ethylene and one or more unsaturated ester monomers. Useful unsaturated esters include: 1) vinyl esters of aliphatic carboxylic acids, where the esters have from 4 to 12 carbon atoms, and 2) alkyl esters of acrylic or methacrylic acid (collectively, "alkyl (meth)acrylate"), where the esters have from 4 to 12 carbon atoms.

Representative examples of the first ("vinyl ester") group of monomers include vinyl acetate, vinyl propionate, vinyl hexanoate, and vinyl 2-ethylhexanoate. The vinyl ester monomer may have from 4 to 8 carbon atoms, from 4 to 6 carbon atoms, from 4 to 5 carbon atoms, and preferably 4 carbon atoms.

Representative examples of the second ("alkyl(meth)acrylate") group of monomers include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl (meth)acrylate monomer may have from 4 to 8 carbon atoms, from 4 to 6 carbon atoms, and preferably from 4 to 5 carbon atoms.

The unsaturated ester (i.e., vinyl ester or alkyl(meth)acrylate) comonomer content of the ethylene/unsaturated ester copolymer may be at least about 3, 6, and 8 wt. % and/or may be at most about 12, 18, and 40 wt. %, based on the weight of the copolymer. Useful ethylene contents of the ethylene/unsaturated ester copolymer include at least about, and/or at most about, any of the following: 60 wt. %, 82 weight %, 85 weight %, 88 weight %, 92 wt. %, 93 wt. %, 94 weight %, and 97 wt. %, based on the weight of the copolymer.

Representative examples of ethylene/unsaturated ester copolymers include ethylene/methyl acrylate, ethylene/methyl methacrylate, ethylene/ethyl acrylate, ethylene/ethyl methacrylate, ethylene/butyl acrylate, ethylene/2-ethylhexyl methacrylate, and ethylene/vinyl acetate.

Another useful ethylene copolymer includes ethylene/(meth)acrylic acid copolymer, which is the copolymer of ethylene and acrylic acid, methacrylic acid, or both.

Other useful ethylene copolymer includes ethylene/norbornene copolymer and ethylene/propylene/diene (EPDM) copolymer. Examples of ethylene/norbornene copolymer include those sold under the Topas™ and Zeonor™ trademarks. Exemplary EPDM copolymer include those sold under the Vistalon™ trademark.

Useful propylene copolymers include those discussed above.

Another useful thermoplastic is ionomer, which is a copolymer of ethylene and an ethylenically unsaturated monocarboxylic acid having the carboxylic acid groups partially neutralized by a metal ion, such as sodium or zinc. Useful ionomers include those in which sufficient metal ion is present to neutralize from about 10% to about 60% of the acid groups in the ionomer. The carboxylic acid is preferably "(meth)acrylic acid"—which means acrylic acid and/or methacrylic acid. Useful ionomers include those having at least 50 weight % and preferably at least 80 weight % ethylene units. Useful ionomers also include those having from 1 to 20 weight percent acid units. Useful ionomers are available, for example, from Dupont Corporation (Wilmington, Del.) under the SURLYN trademark.

Useful polyamides include those of the type that may be formed by the polycondensation of one or more diamines with one or more diacids and/or of the type that may be formed by the polycondensation of one or more amino acids (including those provided by the ring opening polymerization of lactams). Useful polyamides include aliphatic polyamides and aliphatic/aromatic polyamides.

Representative polyamides of the type that may be formed by the polycondensation of one or more diamines with one or more diacids include aliphatic polyamides such as poly(hexamethylene adipamide) ("nylon-6,6"), poly(hexamethylene sebacamide) ("nylon-6,10"), poly(heptamethylene pimelamide) ("nylon-7,7"), poly(octamethylene suberamide) ("nylon-8,8"), poly(hexamethylene azelamide) ("nylon-6,9"), poly(nonamethylene azelamide) ("nylon-9,9"), poly(decamethylene azelamide) ("nylon-10,9"), poly(tetramethylenediamine-co-oxalic acid) ("nylon-4,2"), the polyamide of n-dodecanedioic acid and hexamethylenediamine ("nylon-6, 12"), the polyamide of dodecamethylenediamine and n-dodecanedioic acid ("nylon-12,12").

Representative aliphatic/aromatic polyamides include poly(tetramethylenediamine-co-isophthalic acid) ("nylon-4, I"), polyhexamethylene isophthalamide ("nylon-6,I"), polyhexamethylene terephthalamide ("nylon-6,T"), poly (2,2,2-trimethyl hexamethylene terephthalamide), poly(m-xylylene adipamide) ("nylon-MXD,6"), poly(p-xylylene adipamide), poly(hexamethylene terephthalamide), poly(dodecamethylene terephthalamide), and polyamide-MXD,I.

Representative polyamides of the type that may be formed by the polycondensation of one or more amino acids (including the ring opening of lactams) include poly(4-aminobutyric acid) ("nylon-4"), poly(6-aminohexanoic acid) ("nylon-6" or "poly(caprolactam)"), poly(7-aminoheptanoic acid) ("nylon-7"), poly(8-aminooctanoic acid) ("nylon-8"), poly(9-aminononanoic acid) ("nylon-9"), poly(10-aminodecanoic acid) ("nylon-10"), poly(11-aminoundecanoic acid) ("nylon-11"), and poly(12-aminododecanoic acid) ("nylon-12").

Representative copolyamides include copolymers based on a combination of the monomers used to make any of the foregoing polyamides, such as, nylon-4/6, nylon-6/6, nylon-6/9, nylon-6/12, caprolactam/hexamethylene adipamide copolymer ("nylon-6,6/6"), hexamethylene adipamide/caprolactam copolymer ("nylon-6/6,6"), trimethylene adipamide/hexamethylene azelaiamide copolymer ("nylon-trimethyl 6,2/6,2"), hexamethylene adipamide-hexamethylene-azelaiamide caprolactam copolymer ("nylon-6,6/6,9/6"), hexamethylene adipamide/hexamethylene-isophthalamide ("nylon-6,6/6,I"), hexamethylene adipamide/hexamethyleneterephthalamide ("nylon-6,6/6,T"), nylon-6,T/6,I, nylon-6/MXD,T/MXD,I, nylon-6,6/6,10, and nylon-6,I/6,T.

Useful polyesters include those made by: 1) condensation of polyfunctional carboxylic acids with polyfunctional alcohols, 2) polycondensation of hydroxycarboxylic acid, and 3) polymerization of cyclic esters (e.g., lactone).

Exemplary polyfunctional carboxylic acids (and their derivatives such as anhydrides or simple esters like methyl esters) include aromatic dicarboxylic acids and derivatives (e.g., terephthalic acid, isophthalic acid, dimethyl terephthalate, dimethyl isophthalate) and aliphatic dicarboxylic acids and derivatives (e.g., adipic acid, azelaic acid, sebacic acid, oxalic acid, succinic acid, glutaric acid, dodecanoic diacid, 1,4-cyclohexane dicarboxylic acid, dimethyl-1,4-cyclohexane dicarboxylate ester, dimethyl adipate). Useful dicarboxylic acids also include those discussed above in the polyamide section. As is known to those of skill in the art, polyesters may be produced using anhydrides and esters of polyfunctional carboxylic acids.

Exemplary polyfunctional alcohols include dihydric alcohols (and bisphenols) such as ethylene glycol, 1,2-propanediol, 1,3-propanediol, 1,3 butanediol, 1,4-butanediol, 1,4-cyclohexanedimethanol, 2,2-dimethyl-1,3-propanediol, 1,6-hexanediol, poly(tetrahydroxy-1,1'-biphenyl, 1,4-hydroquinone, and bisphenol A.

Exemplary hydroxycarboxylic acids and lactones include 4-hydroxybenzoic acid, 6-hydroxy-2-naphthoic acid, pivalolactone, and caprolactone.

Useful polyesters include homopolymers and copolymers. These may be derived from one or more of the constituents discussed above. Exemplary polyesters include poly(ethylene terephthalate) ("PET"), poly(butylene terephthalate) ("PBT"), and poly(ethylene naphthalate) ("PEN"). If the polyester includes a mer unit derived from terephthalic acid, then such mer content (mole %) of the diacid of the polyester may be at least about any the following: 70, 75, 80, 85, 90, and 95%.

Useful polyesters may be derived from lactone polymerization; these include, for example, polycaprolactone and polylactic acid.

The polyester may be thermoplastic. The polyester (e.g., copolyester) of the film may be amorphous, or may be partially crystalline (semi-crystalline), such as with a crystallinity of at least about, or at most about, any of the following weight percentages: 10, 15, 20, 25, 30, 35, 40, and 50%.

The skin layer may have a composition such that any one of the above described polymers (i.e., a first polymer) comprises at least about, and/or at most about, any of the following amounts: 40, 50, 60, 70, 80, 90, 95, and 100%, by weight of the layer. The skin layer may comprise a second polymer of any of the above described polymers in at least about, and/or at most about, any of the following amounts: 50, 40, 30, 20, 10, and 5%, by weight of the layer.

Any of the polymers of the skin layer may have a melt index of at most about, and/or at least about, any of the following values: 10, 8, 6, 5, 4, 3, 2, 1, 0.8, 0.5, and 0.3 g/10 minutes. All references to melt index values in this application are measured by ASTM D1238, which is incorporated herein in its entirety by reference, under Condition 190/2.16, unless the ASTM test method specifies a different temperature and piston weight for the material.

Additional Film Layers

Below are some examples of combinations in which the alphabetical symbols designate the film layers. Where the multilayer film representation below includes the same letter more than once, each occurrence of the letter may represent the same composition or a different composition within the class that performs a similar function. A/C/B/A, A*/C/B/A**, A*//C/B/A**, A*/C//B/A**, A/D/C/B/A, A*/D/C/B/A**, A*/D//C/B/A**, A*/D/C//B/A**, A/C/D/B/A, A*/C/D/B/A**, A*//C/D/B/A**, A*/C//D/B/A**, A/D/C/D/B/A, A*/D/C/D/B/A**, A*/D//C/D/B/A**, A*/D/C//D/B/A**, A/B/C/A, A*/B/C/A**, A*/B//C/A**, A*/B//C/A**, A/E/C/B/A, A*/E/C/B/A**, A*/E//C/B/A**, A*/E/C//B/A**, A*/E/D/C/B/A**, A*/E/C/D/B/A**, A*/E/D//C/B/A**, A*/E//C/D/B/A**, A*/E/D/C/D/B/A**, A*/E/D//C/D/B/A, A/E/C/B/A*, A**/E//C/B/A*, A**/E/C//B/A*, A**/E/D/C/B/A*, A**/E/C/D/B/A*, A**/E/D/C/D/B/A*, A**/E/D//C/D/B/A*

"A" represents a skin layer, as discussed above.

"A*" represents a sealant layer (i.e., heat seal layer), that is, a layer adapted to facilitate the heat-sealing of the film to itself or to another object, such as a substrate. A sealant layer may have any of the compositions and characteristics as discussed in the skin layer section of this Application.

"A**" represents an abuse layer (i.e., an outside or print side layer). The film may support a printed image on an outside layer. The film may incorporate a printed image on an internal layer, for example by trap printing. The abuse layer may have any of the compositions and characteristics as discussed in the skin layer section of this Application "B" represents an intermediate layer, as discussed above.

"C" represents a barrier layer, as discussed above.

"D" represents a tie layer, as discussed below.

"E" represents a core layer (e.g., a bulk layer and/or a shrink layer). The term "shrink layer" refers to an internal layer having a composition, configuration, and thickness such that the layer has significant effect in inducing compatible shrinkage of the overall multilayer film structure. The relative thickness of a shrink layer may be selected as sufficient relative to that of the overall film thickness so that the activation of the shrink characteristic of the shrink layer may essentially control the shrinkage of the entire multilayer film. The "//" indicates an extrusion coating interface of the film.

Core Layers

The film may comprise one or more core layers. A core layer is an internal layer of the film. A core layer may comprise any of the thermoplastic polymers described above. A core layer may have a composition such that any one of the above described polymers (i.e., a first polymer) comprises at least about, and/or at most about, any of the following amounts: 40, 50, 60, 70, 80, 90, 95, and 100%, by weight of the layer. The core layer may comprise a second polymer of any of the above described polymers in at least about, and/or at most about, any of the following amounts: 50, 40, 30, 20, 10, and 5%, by weight of the layer.

Tie Layers

The film may comprise one or more tie layers. A tie layer is a layer directly adhered (i.e., directly adjacent) to first and third layers, and has the primary function of improving the adherence of the first layer to the third layer. For example, the film may include one or two tie layers each directly adhered to a barrier layer.

A tie layer may comprise one or more polymers having grafted polar groups so that the polymer is capable of enhanced bonding to polar polymers such as PVdC or EVOH. Useful polymers for tie layers include ethylene/unsaturated acid copolymer, ethylene/unsaturated ester copolymer, anhydride-modified polyolefin, polyurethane, polyamide, and mixtures thereof. Further exemplary polymers for tie layers include ethylene/vinyl acetate copolymer having a vinyl acetate content of at least about, and/or at most about, any of the following: 3, 6, 15, 20, 25, and 30 weight %; ethylene/methyl acrylate copolymer having a methyl acrylate content of at least about 20 weight %; anhydride-modified ethylene/methyl acrylate copolymer having a methyl acrylate content of at least about any of the following: 5, 10, 15, and 20 weight %; and anhydride-modified ethylene/alpha-olefin copolymer, such as an anhydride grafted LLDPE. A tie layer may comprise at least about 70, 80, 90, 95, and 100% by weight of the tie layer, of one or more of the polymers described in this paragraph.

Modified polymers or anhydride-modified polymers include polymers prepared by copolymerizing an unsaturated carboxylic acid (e.g., maleic acid, fumaric acid), or a derivative such as the anhydride, ester, or metal salt of the unsaturated carboxylic acid with—or otherwise incorporating the same into—an olefin homopolymer or copolymer. Thus, anhydride-modified polymers have an anhydride functionality achieved by grafting or copolymerization.

Film Layer Thicknesses

Any of the layers of the film may have a thickness of at least about, and/or at most about, any of the following: 0.05, 0.1, 0.5, 1, 1.3, 1.5, 2, 2.5, 3, 4, 5, and 6 mils. Any of the layers of the film may have a thickness as a percentage of the total thickness of the film of at least about, and/or at most about, any of the following: 1, 3, 5, 7, 10, 15, 20, 25, 30, 35, 40, 45, and 50 percent.

Modulus of the Film

The film preferably exhibits a Young's modulus sufficient to withstand the expected handling and use conditions, such as the handling conditions during machine processing of the film to create bags. Young's modulus may be measured in accordance with one or more of the following ASTM procedures: D882; D5026; D4065, each of which is incorporated herein in its entirety by reference. The film may have a Young's modulus of at least about, and/or at most about, any of the following: 10,000; 15,000; 18,000; 20,000, 25,000; 30,000; 35,000; 40,000; 70,000; 80,000; 90,000; and 100,000 pounds/square inch, measured at a temperature of 73° F. The film may have any of the forgoing ranges of Young's modulus in at least one direction (e.g., in the machine direction or in the transverse direction) or in both directions (i.e., the machine (i.e., longitudinal) and the transverse directions).

Appearance Characteristics of the Film

The haze of the film may be at most about, and/or at least about, any of the following values: 30%, 25%, 20%, 15%, 10%, 8%, 5%, and 3%. Haze is a measurement of the transmitted light scattered more than 2.5° from the axis of the incident light. Haze is measured against the outside layer of the film. Haze is measured according to the method of ASTM D 1003, which is incorporated herein in its entirety by reference. All references to "haze" values in this application are by this standard.

The film may have a gloss (i.e., specular gloss) as measured against the outside layer of at least about, and/or at most about, any of the following values: 40%, 50%, 60%, 63%, 65%, 70%, 75%, 80%, 85%, 90%, and 95%. These percentages represent the ratio of light reflected from the sample to the original amount of light striking the sample at the designated angle. All references to "gloss" values in this application are in accordance with ASTM D 2457 (45° angle), which is incorporated herein in its entirety by reference.

The film may be transparent (at least in the non-printed regions) so that a packaged article may be visible through the film. "Transparent" means that the film transmits incident light with negligible scattering and little absorption, enabling objects (e.g., the packaged article or print) to be seen clearly through the film under typical viewing conditions (i.e., the expected use conditions of the material). The regular transmittance (i.e., clarity) of the film may be at least about, and/or at most about, any of the following values: 30%, 40%, 50%, 65%, 70%, 75%, 80%, 85%, and 90%, measured in accordance with ASTM D1746. All references to "regular transmittance" values in this application are by this standard.

The total luminous transmittance (i.e., total transmittance) of the film may be at least about, and/or at most about, any of the following values: 30%, 40%, 50%, 65%, 70%, 75%, 80%, 85%, and 90%, measured in accordance with ASTM D1003. All references to "total luminous transmittance" values in this application are by this standard.

The measurement of optical properties of plastic films, including the measurement of total transmission, haze, clarity, and gloss, is discussed in detail in Pike, LeRoy, "Optical Properties of Packaging Materials," Journal of Plastic Film & Sheeting, vol. 9, no. 3, pp. 173-80 (July 1993), of which pages 173-80 is incorporated herein by reference.

Heat-Shrink Characteristic

The film may have a free shrink at 185° F. (85° C.) in at least one direction (e.g., the machine direction or the transverse direction) and/or in both the machine and transverse directions of at least about, and/or at most about, any of the following: 10%, 15%, 25%, 30%, 40%, 45%, 50%, 55%, 60%, 70%, and 80%.

The film may have unequal free shrink in both directions, that is differing free shrink in the machine and transverse directions. For example, the film may have a free shrink (185° F.) in the machine direction of at least 40% and a free shrink (185° F.) in the transverse direction of at least 25%. The film may not have a heat shrink characteristic in both directions. For example, the film may have a free shrink at 185° F. in one direction of less than about any of the following: 5%, 4%, 3%, 2%, 1%, and 0%; while the film may have a shrink characteristic at 185° F. in another direction. The free shrink of the film is determined by measuring the percent dimensional change in a 10 cm×10 cm film specimen when subjected to selected heat (i.e., at a specified temperature exposure) according to ASTM D2732, which is incorporated herein in its entirety by reference. All references to free shrink in this application are measured according to this standard.

As is known in the art, a heat-shrinkable film shrinks upon the application of heat while the film is in an unrestrained state. If the film is restrained from shrinking to some extent—for example by a packaged product around which the film shrinks—then the tension of the heat-shrinkable film increases upon the application of heat. Accordingly, a heat-shrinkable film that has been exposed to heat so that at least a portion of the film is either reduced in size (unrestrained) or under increased tension (restrained) is considered a heat-shrunk (i.e., heat-contracted) film.

The film may exhibit a shrink tension at 185° F. in at least one direction, and/or in at least both of the machine and transverse directions, of at least about, and/or at most about, any of the following: 50 psi, 75 psi, 100 psi, 125 psi, 150 psi, 175 psi, 200 psi, 225 psi, 250 psi, 275 psi, 300 psi, 325 psi, 350 psi, 400 psi, 450 psi, 500 psi, 550 psi, and 600 psi. The film may have unequal shrink tension in both directions, that is differing shrink tension in the machine and transverse directions. The film may not have a shrink tension in one or both directions. Shrink tension is measured at a specified temperature (e.g., 185° F.) in accordance with ASTM D 2838 (Procedure A), which is incorporated herein in its entirety by reference. All references to shrink tension in this application are by this standard.

The film may be annealed or heat-set to reduce the free shrink slightly or substantially; or the film may not be heat set or annealed once the oriented film has been quenched in order that the film will have a high level of shrink characteristic (e.g., heat shrinkability).

Bond Strength of the Film

The term "bond strength" as used herein means the amount of force required to separate or delaminate the film at adjacent film layers by adhesive failure, or to cause cohesive failure within an adjacent layer, plus the force to bend the layers during the test, as measured in accordance with ASTM F904, using an Instron tensile tester crosshead speed of 10 inches per minute and five, 1-inch wide, representative samples while supporting the unseparated portion of each test specimen at 90° to the direction of draw. An "adhesive failure" is a failure in which the interfacial forces (e.g., valence forces or interlocking action or both) holding two surfaces together are overcome.

The minimum bond strength of the film is the weakest bond strength indicated from the testing of the separation at each of the layers of the film. The minimum bond strength indicates the internal strength with which a film remains intact to function as a single unit. The bond strength is provided both by inter-layer adhesion (i.e., the inter-layer adhesive bond strength) and by the intra-layer cohesion of each film layer (i.e., the intra-layer cohesive strength).

The minimum bond strength of the film may be at least about any of the following: 1, 1.5, 2, 2.5, 2.6, 2.8, 3, 3.5, 4, and 4.5 pounds/inch. The minimum bond strength between each of the adjacent layers of a plurality of layers of the film may be at least about any of the values in the preceding sentence, measured according to ASTM F904.

The minimum bond strength between the intermediate layer and each of the layers directly adjacent the intermediate layer may be at least about any of the following: 1, 1.5, 2, 2.5, 2.6, 2.8, 3, 3.5, 4, and 4.5 pounds/inch measured according to ASTM F904.

Manufacturing the Film

The film may be manufactured by thermoplastic film-forming processes known in the art. The film may be prepared by extrusion or coextrusion utilizing, for example, a tubular trapped bubble film process or a flat film (i.e., cast film or slit die) process. The film may also be prepared by applying one or more layers by extrusion coating, adhesive lamination, extrusion lamination, solvent-borne coating, or by latex coating (e.g., spread out and dried on a substrate). A combination of these processes may also be employed. These processes are known to those of skill in the art.

The film may be oriented in either the machine (i.e., longitudinal), the transverse direction, or in both directions (i.e., biaxially oriented), for example, to enhance the strength, optics, and durability of the film. A web or tube of the film may be uniaxially or biaxially oriented by imposing a draw force at a temperature where the film is softened (e.g., above the vicat softening point; see ASTM 1525) but at a temperature below the film's melting point. The film may then be quickly cooled to retain the physical properties generated during orientation and to provide a heat-shrink characteristic to the film. The film may be oriented using, for example, a tenter-frame process or a bubble process. These processes are known to those of skill in the art, and therefore are not discussed in detail here. The orientation may occur in at least one direction by at least about, and/or at most about, any of the following ratios: 1.5:1, 2:1, 2.5:1, 3:1, 3.5:1, 4:1, 5:1, 6:1, 7:1, 8:1, 9:1, 10:1, 12:1, and 15:1.

Optional Energy Treatment

One or more of the layers of the film—or at least a portion of the entire film—may be cross-linked, for example, to improve the strength of the film. Cross-linking may be achieved by using chemical additives or by subjecting one or more film layers to one or more energetic radiation treatments—such as ultraviolet, or ionizing radiation such as X-ray, gamma ray, beta ray, and high energy electron beam treatment—to induce cross-linking between molecules of the irradiated material. Useful ionizing radiation dosages include at least about, and/or at most about, any of the following: 5, 7, 10, 15, 20, 25, 30, 35, 40, 45, 50, 55, 60, 65, 70, 75, 80, 90, 100, 110, 120, 130, and 150 kGy (kiloGray). The cross-linking may occur before the orientation process, for example, to enhance the film strength before orientation, or the cross-linking may occur after the orientation process.

It may be desirable to avoid irradiating one or more film layers, for example, a film layer comprising PVdC or the intermediate layer. To that end, one or more substrate layers may be extruded and irradiated, and any of the PVdC-containing layer, the intermediate layer, and subsequent layers may then be applied to the irradiated substrate, for example, by an extrusion coating process. This will produce an extrusion coating interface, as referenced in the Additional Film Layers section above. Further, the PEC of the intermediate layer may be substantially devoid of crosslinks.

Use of the Film

A package comprising the film may enclose a product, such as a food product selected from one or more of cheese, meat products, fresh red meat products, poultry, pork, beef, sausage, lamb, goat, horse, and fish. The package may be a bag comprising the film. For example, the film may be formed into a bag, such as by sealing the inside layer to itself in selected regions, or by sealing the inside layer to the outside layer in selected regions (i.e., a lap seal). Useful bags configurations include an end-seal bag, a side-seal bag, an L-seal bag (i.e., sealed across the bottom and along one side with an open top), and a pouch (i.e., sealed on three sides with an open top). The film may be provided in a tubular configuration, in which case only an end seal and a top seal need to be made to form a closed bag.

After forming the bag, the product may be inserted into the bag, and the open end of the bag sealed to enclose the product. The film may also be wrapped around a product and heat sealed to form a package enclosing the product. The film may be used as a wrap to cover and secure a product (e.g., a food product) that rests on a tray. The film may be used as a lid adapted to be sealed to a support (e.g., a tray) for the packaged product.

The package enclosing the product may be subjected to an elevated temperature to activate the heat shrink characteristic of the film so that the film and/or package comprising the film may conform to the contour of the enclosed packaged product. For example, the package may be passed through a hot air or steam tunnel or hot water bath.

During the packaging process and before the heat shrink characteristic of the film is activated, the pressure of the interior space of the package enclosing the packaged product may be lowered below that of outside ambient pressure, for example, as is done during a vacuum packaging process. Alternatively, a vent hole may be made in the package so that the film may conform to the packaged product as the film shrinks.

EXAMPLES

The following examples are presented for the purpose of further illustrating and explaining the present invention and are not to be taken as limiting in any regard. Unless otherwise indicated, all parts and percentages are by weight.

The following abbreviations are used in the Examples:

VLDPE1 is a homogeneous very low density polyethylene believed to have about 13 wt % octene comonomer content and a melt temperature of 99° C. available from Dow Corporation under the AFFINITY trademark.

VLDPE2 is a homogeneous very low density polyethylene believed to have about 12.5 wt % octene comonomer content, a density of 0.901 g/cc, and a melt index of 0.9 g/10 minutes available from Dow Corporation under the AFFINITY trademark.

VLDPE3 is a homogeneous very low density polyethylene believed to have about 12 wt % octene comonomer content and a melt temperature of 97° C. available from Dow Corporation under the AFFINITY trademark.

VLDPE4 is a heterogeneous very low density polyethylene believed to have a melt temperature of 123° C. available from Dow Corporation under the ATTANE trademark.

EMAA1 is an ethylene/methacrylic acid copolymer available from Dupont under the NUCREL 3101 trade name.

EPD is an ethylene/propylene/diene copolymer believed to have a density of 0.870 g/cc and a melt index of 1.5 g/10 minutes.

EVA1 is an ethylene/vinyl acetate copolymer having a vinyl acetate comonomer content of about 15 wt % available from Exxon Corporation under the ESCORENE trademark.

EVA2 is an ethylene/vinyl acetate copolymer having a vinyl acetate comonomer content of about 28 wt % available from Exxon Corporation under the ESCORENE trademark.

EVA3 is an ethylene/vinyl acetate copolymer having a vinyl acetate comonomer content of about 8.9 wt % available from Dupont Corporation under the ELVAX trademark.

LLDPE1 is a linear low density polyethylene available from Dow under the XUS trade name.

LLDPE2 is a linear low density polyethylene available from Dow under the ECD trade name.

PEB1 is a propylene/ethylene/butene copolymer having a propylene comonomer content of about 87 wt %, an ethylene comonomer content of about 1.3 wt %, and a butene comonomer content of about 11.7 wt % available from Solvay (Innovene) Corporationunder the ELTEX trademark.

PEB2 is a propylene/ethylene/butene copolymer having a propylene comonomer content of about 80.7 wt %, an ethylene comonomer content of about 1 wt %, and a butene comonomer content of about 18.3 wt % available from Solvay (Innovene) Corporation under the ELTEX trademark.

PEC1 is a propylene/ethylene copolymer having an ethylene content of about 3.3 wt % available from Exxon Corporation under the ESCORENE PP trademark.

PEC2 is a propylene/ethylene copolymer having an ethylene content of about 2.8 wt % available from Exxon Corporation under the ESCORENE PP trademark.

PP1 is a propylene homopolymer believed to have a melting point of 163° C. available from Exxon-Corporation under the ESCORENE trademark.

PVdC1 is a stabilized vinylidene chloride/methyl acrylate copolymer available from Dow Corporation under the Saran 806 trade name.

MB is a master batch of antiblock and slip agents in a linear low density polyethylene matrix.

Eleven films (Examples 1-7 and Comparatives 1-4) having the configuration and composition as shown in Table 1 were made. Layers 1-3 were coextruded to form a substrate film, and then electron beam irradiated to effect crosslinking. Layers 4-7 were then extrusion coated onto to the substrate film to form a tape film having a total thickness before orientation of about 23 mils. The resulting tape film was then biaxially oriented and quenched so that the resulting film was heat shrinkable. The total film thickness of the oriented film was about 2.2 mils.

TABLE 1

| | Layer No.: | | | | | | |
|---|---|---|---|---|---|---|---|
| | 1 | 2 | 3 | 4 | 5 | 6 | 7 |
| Function: | sealant | core | tie | barrier | tie | core | abuse |
| Thickness* (mils): | 5 | 9 | 1 | 2 | 1 | 3 | 2 |
| Thickness** (mils): | 0.48 | 0.86 | 0.096 | 0.19 | 0.096 | 0.29 | 0.19 |
| Example 1 (NBX0197) | VLDPE1 | 90% LLDPE1 10% LLDPE2 | EVA1 | PVdC1 | EVA2 | PEB1 | VLDPE3 |
| Example 2 (NBX0200) | VLDPE1 | 90% LLDPE1 10% LLDPE2 | EVA1 | PVdC1 | EVA2 | PEB2 | VLDPE3 |
| Example 3 (NBX0268) | 90% VLDPE1 10% MB | 90% LLDPE1 10% LLDPE2 | EVA1 | PVdC1 | EVA2 | PEC1 | VLDPE3 |
| Example 4 (NBX0282) | 90% VLDPE1 10% MB | 90% LLDPE1 10% LLDPE2 | EVA1 | PVdC1 | EVA1 | PEC1 | VLDPE3 |
| Example 5 (NBX0288) | 90% VLDPE1 10% MB | 90% LLDPE1 10% LLDPE2 | EVA1 | PVdC1 | EVA3 | PEC2 | VLDPE3 |
| Example 6 (NBX0317) | 90% VLDPE1 10% MB | 90% LLDPE1 10% LLDPE2 | EVA1 | PVdC1 | EVA1 | 80% PEC1 20% LLDPE1 | VLDPE3 |
| Compare 1 (B255A) | VLDPE1 | 90% VLDPE2 10% EPD1 | EVA1 | PVdC1 | EVA2 | VLDPE2 | VLDPE3 |
| Compare 2 (NBX0229) | 90% VLDPE1 10% MB | 90% LLDPE1 10% LLDPE2 | EVA1 | PVdC1 | EVA2 | 60% LLDPE1 40% PP1 | VLDPE3 |
| Compare 3 (NBX0235) | 90% VLDPE1 10% MB | 90% LLDPE1 10% LLDPE2 | EVA1 | PVdC1 | EVA2 | 70% VLDPE4 30% EMAA1 | VLDPE3 |
| Compare 4 (NBX0375) | 90% VLDPE1 10% MB | LLDPE1 | EVA1 | PVdC1 | EVA1 | 90% LLDPE1 10% LLDPE2 | EPC1 |

*Before orientation.
**After orientation.

The Examples 1-7 and Comparative 1-4 films had the physical properties as recited in Table 2.

TABLE 2

| | Longitudinal** Modulus (kpsi) | Transverse** Modulus (psi) | Haze (%) | Gloss (%) | Total Free*** Shrink (%) |
|---|---|---|---|---|---|
| Example 1 (NBX0197) | 27,700 | 29,900 | 3.9 | 92 | 82.5 |
| Example 2 (NBX0200) | 29,100 | 35,900 | 3.7 | 92 | 85.0 |
| Example 3 (NBX0268) | 30,100 | 31,700 | 4.1 | 88 | 81.0 |
| Example 4 (NBX0282) | 33,900 | 35,900 | 3.6 | 90 | 78.5 |
| Example 5 (NBX0288) | 36,000 | 38,500 | 4.8 | 88 | 81.5 |
| Example 6 (NBX0317) | 23,800 | 29,100 | 2.6 | 89 | 80.0 |
| Compare 1* (B255A) | 19,000 | 21,700 | 3.4 | 86 | 88.0 |
| Compare 1* (B255A) | 18,700 | 18,900 | 4.9 | 81 | 87.0 |
| Compare 2 (NBX0229) | 25,100 | 26,400 | 4.3 | 87 | 72.0 |
| Compare 3 (NBX0235) | 23,600 | 21,800 | 4.6 | 84 | 82.5 |
| Compare 4 (NBX0375) | 30,800 | 30,200 | 5.6 | 78 | 80.0 |

*Two separate production runs were made for the Comparative 1 film.
**The young's modulus of elasticity was measured according to ASTM D882.
***The total free shrink was obtained by adding the free shrinks in the longitudinal (machine) and transverse directions together.

These results surprisingly showed that incorporating PEC (e.g, propylene/ethylene/butene copolymer) as an internal layer of the film (Examples 1-6) resulted in a markedly increased modulus characteristic (i.e., enhanced stiffness and machinability) without a significant deterioration of the optical characteristics (e.g., haze and gloss) of the films compared to films having an ethylene/alpha olefin copolymer based internal layer (Comparatives 1-3). It was also surprisingly found that the incorporation of PEC as an internal layer significantly improved the optical characteristics compared to a film having the PEC as an outer layer (Compare 4). Also, blending a polypropylene homopolymer in an internal layer (Compare 2) unexpectedly resulted in a film having significantly lower total free shrink characteristics.

Any numerical value ranges recited herein include all values from the lower value to the upper value in increments of one unit provided that there is a separation of at least 2 units between any lower value and any higher value. As an example, if it is stated that the amount of a component or a value of a process variable (e.g., temperature, pressure, time) may range from any of 1 to 90, 20 to 80, or 30 to 70, or be any of at least 1, 20, or 30 and/or at most 90, 80, or 70, then it is intended that values such as 15 to 85, 22 to 68, 43 to 51, and 30 to 32, as well as at least 15, at least 22, and at most 32, are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. The definitions and disclosures set forth in the present Application control over any inconsistent definitions and disclosures that may exist in an incorporated reference. All references to ASTM tests are to the most recent, currently approved, and published version of the ASTM test identified, as of the priority filing date of this application. Each such published ASTM test method is incorporated herein in its entirety by this reference.

What is claimed is:

1. A film comprising:
   a barrier layer comprising vinylidene chloride polymer;
   a skin layer forming an outer surface of the film; and
   an intermediate layer between the barrier layer and the skin layer, wherein:
     the intermediate layer comprises at least about 60%, by weight of the intermediate layer, of propylene/ethylene copolymer; and
     the film has at least about 10% free shrink in at least one direction measured at 85° C. according to ASTM D2732, wherein the intermediate layer is directly adjacent the skin layer.

2. The film of claim 1 wherein the intermediate layer comprises at least about 65 wt % propylene/ethylene copolymer.

3. The film of claim 1 wherein the propylene/ethylene copolymer has an ethylene monomer content of at least about 1 wt % and at most about 12 wt %.

4. The film of claim 1 wherein the propylene/ethylene copolymer of the intermediate layer is substantially devoid of crosslinks.

5. The film of claim 1 wherein:
   the Young's modulus of the film in both the machine and transverse directions is at least about 20,000 psi; and
   the gloss of the film is at least about 70%.

6. The film of claim 1 wherein:
   the Young's modulus of the film in both the machine and transverse directions is at least about 25,000 psi;
   the gloss of the film is at least about 80%; and
   the free shrink of the film in at least one direction at 85° C. is at least about 30%.

7. The film of claim 1 wherein the free shrink of the film in at least one direction is at least about 35%.

8. The film of claim 1 wherein:
   the film comprises a first layer and a second layer;
   the first and second layers are directly adjacent the intermediate layer and are on opposite sides of the intermediate layer; and
   the minimum bond strength between each of the first and second layers and the intermediate layer is at least about 2.6 pounds per inch measured according to ASTM F904.

9. The film of claim 1 wherein the film comprises at most about 10.0% propylene/ethylene copolymer by weight of the film.

10. The film of claim 1 wherein the intermediate layer is substantially devoid of polybutylene polymer.

11. The film of claim 1 wherein the film is substantially devoid of polybutylene polymer.

12. A bag comprising the film of claim 1.

13. The film of claim 1 wherein the intermediate layer comprises less than about 40 wt. % polybutylene polymer based on the weight of the intermediate layer.

14. A film comprising:
   a barrier layer comprising a polymer selected from vinylidene chloride polymer and ethylene/vinyl alcohol copolymer;
   a skin layer forming an outer surface of the film; and
   an intermediate layer between the barrier layer and the skin layer, wherein:
     the intermediate layer comprises at least about 60%, by weight of the intermediate layer, of propylene/ethylene copolymer wherein the propylene/ethylene copolymer comprises propylene/ethylene/butylene copolymer; and
     the film has at least about 10% free shrink in at least one direction measured at 85° C. according to ASTM D2732, wherein the intermediate layer is directly adjacent the skin layer.

15. The film of claim 14 wherein:
   the intermediate layer further comprises very low density polyethylene.

16. A film comprising:
   a barrier layer comprising a polymer selected from vinylidene chloride polymer and ethylene/vinyl alcohol copolymer;
   a skin layer forming an outer surface of the film; and
   an intermediate layer between the barrier layer and the skin layer, wherein:
     the intermediate layer comprises at least about 60%, by weight of the intermediate layer, of propylene/ethylene copolymer;
     the intermediate layer further comprises a polymer selected from very low density polyethylene, low density polyethylene, ethylene/vinyl acetate copolymer, or homogeneous polyethylene;
     the intermediate layer is directly adjacent the skin layer; and
     the film has at least about 10% free shrink in at least one direction measured at 85° C. according to ASTM D2732.

17. The film of claim 16 wherein the intermediate layer comprises very low density polyethylene.

18. The film of claim 17 wherein the very low density polyethylene has a melt index of at most about 3 g/10 minutes measured according to ASTM 1238.

19. The film of claim 18 wherein the very low density polyethylene has a melt index of at most about 1 g/10 minutes measured according to ASTM 1238.

20. A film comprising:
   a barrier layer comprising a polymer selected from vinylidene chloride polymer and ethylene/vinyl alcohol copolymer;
   a skin layer forming an outer surface of the film: and
   an intermediate layer between the barrier layer and the skin layer, wherein:
     the intermediate layer comprises at least about 60%, by weight of the intermediate layer, of propylene/ethylene copolymer; and
     the film has at least about 10% free shrink in at least one direction measured at 85° C. according to ASTM D2732;
     the intermediate layer is directly adjacent the skin layer;
     the film comprises a plurality of layers; and
     the bond strength between each of the adjacent layers of the plurality of layers is at least about 2.6 pounds per inch measured according to ASTM F904.

21. A film comprising:
a barrier layer comprising a polymer selected from vinylidene chloride polymer and ethylene/vinyl alcohol copolymer;
a skin layer forming an outer surface of the film;
an intermediate layer between the barrier layer and the skin layer; and
an internal layer between the intermediate layer and the barrier layer, wherein:
the intermediate layer is not directly adjacent the barrier layer;
the intermediate layer comprises at least about 60%, by weight of the intermediate layer, of propylene/ethylene copolymer;
the film has at least about 10% free shrink in at least one direction measured at 85° C. according to ASTM D2732; and
the intermediate layer is directly adjacent the skin layer.

22. The film of claim 21 wherein the internal layer comprises a tie layer comprising one or more polymers selected from ethylene/unsaturated acid copolymer, ethylene/unsaturated ester copolymer, anhydride-modified polyolefin, ethylene/vinyl acetate copolymer, ethylene/methyl acrylate copolymer, anhydride-modified ethylene/methyl acrylate copolymer, anhydride-modified ethylene/alpha-olefin copolymer, polyurethane, or polyamide.

23. The film of claim 22 wherein the tie layer is directly adjacent the barrier layer and comprises at least about 30% by weight of the tie layer of one or more polymers selected from ethylene/unsaturated acid copolymer, ethylene/unsaturated ester copolymer, anhydride-modified polyolefin, ethylene/vinyl acetate copolymer, ethylene/methyl acrylate copolymer, anhydride-modified ethylene/methyl acrylate copolymer, or anhydride-modified ethylene/alpha-olefin copolymer.

24. A film comprising:
a barrier layer comprising vinylidene chloride polymer, wherein the film comprises only one barrier layer;
a skin layer forming an outer surface of the film; and
an intermediate layer between the barrier layer and the skin layer, wherein:
the intermediate layer comprises at least about 50%, by weight of the intermediate layer, of propylene/ethylene copolymer; and
the film has at least about 10% free shrink in at least one direction measured at 85° C. according to ASTM D2732.

25. The film of claim 24 wherein the intermediate layer is directly adjacent the skin layer.

26. The film of claim 24 wherein the intermediate layer comprises at least about 65 wt % propylene/ethylene copolymer.

27. The film of claim 24 wherein the propylene/ethylene copolymer has an ethylene monomer content of at least about 1 wt % and at most about 12 wt %.

28. The film of claim 24 wherein the free shrink of the film in at least one direction is at least about 35%.

29. The film of claim 24 wherein:
the film comprises a first layer and a second layer:
the first and second layers are directly adjacent the intermediate layer and are on opposite sides of the intermediate layer; and
the minimum bond strength between each of the first and second layers and the intermediate layer is at least about 2.6 pounds per inch measured according to ASTM F904.

30. The film of claim 24 wherein:
the film comprises a plurality of layers; and
the bond strength between each of the adjacent layers of the plurality of layers is at least about 2.6 pounds per inch measured according to ASTM F904.

31. The film of claim 24 wherein the film comprises at most about 10.0% propylene/ethylene copolymer by weight of the film.

32. The film of claim 24 wherein the intermediate layer is substantially devoid of polybutylene polymer.

33. The film of claim 24 wherein the film is substantially devoid of polybutylene polymer.

34. A bag comprising the film of claim 24.

35. The film of claim 24 wherein the intermediate layer comprises less than about 40 wt. % polybutylene polymer based on the weight of the intermediate layer.

36. A film comprising:
a barrier layer comprising a polymer selected from vinylidene chloride polymer and ethylene/vinyl alcohol copolymer. wherein the film comprises only one barrier layer;
a skin layer forming an outer surface of the film; and
an intermediate layer between the barrier layer and the skin layer, wherein:
the intermediate layer comprises at least about 50%, by weight of the intermediate layer, of propylene/ethylene copolymer;
the propylene/ethylene copolymer comprises propylene/ethylene/butylene copolymer; and
the film has at least about 10% free shrink in at least one direction measured at 85° C. according to ASTM D2732.

37. A film comprising:
a barrier layer comprising a polymer selected from vinylidene chloride polymer and ethylene/vinyl alcohol copolymer, wherein the film comprises only one barrier layer;
a skin layer forming an outer surface of the film; and
an intermediate layer between the barrier layer and the skin layer, wherein:
the intermediate layer comprises at least about 50%, by weight of the intermediate layer, of propylene/ethylene copolymer;
the intermediate layer further comprises a polymer selected from very low density polyethylene, low density polyethylene, ethylene/vinyl acetate copolymer, or homogeneous polyethylene; and
the film has at least about 10% free shrink in at least one direction measured at 85° C. according to ASTM D2732.

38. A film comprising:
a barrier layer comprising a polymer selected from vinylidene chloride polymer and ethylene/vinyl alcohol copolymer, wherein the film comprises only one barrier layer;
a skin layer forming an outer surface of the film;
an intermediate layer between the barrier layer and the skin layer; and
an internal layer between the intermediate layer and the barrier layer, wherein:
the intermediate layer comprises at least about 50%, by weight of the intermediate layer, of propylene/ethylene copolymer;
the intermediate layer is not directly adjacent the barrier layer; and
the film has at least about 10% free shrink in at least one direction measured at 85° C. according to ASTM D2732.

* * * * *